United States Patent
Lifchits et al.

(10) Patent No.: US 7,602,575 B1
(45) Date of Patent: Oct. 13, 2009

(54) DISK DRIVE ADJUSTING ESTIMATED READER/WRITER OFFSET TO ACHIEVE TARGET BURST CROSSING SIGNAL AMPLITUDE WHEN PROPAGATING SERVO SECTORS

(75) Inventors: Yakov M. Lifchits, San Jose, CA (US); Lawrence M. Bryant, Palo Alto, CA (US); Siri S. Weerasooriya, Campbell, CA (US); Wing Ying, Fremont, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 12/120,382

(22) Filed: May 14, 2008

(51) Int. Cl.
*G11B 21/02* (2006.01)
*G11B 20/20* (2006.01)
*G11B 5/596* (2006.01)

(52) U.S. Cl. .................. 360/75; 360/76; 360/77.08

(58) Field of Classification Search .................. None
See application file for complete search history.

(56) References Cited

U.S. PATENT DOCUMENTS

| | | | |
|---|---|---|---|
| 4,414,589 A | 11/1983 | Oliver et al. | |
| 5,500,776 A | 3/1996 | Smith | |
| 5,541,784 A | 7/1996 | Cribbs et al. | |
| 5,612,833 A | 3/1997 | Yarmchuk et al. | |
| 5,615,058 A | 3/1997 | Chainer et al. | |
| 5,659,436 A | 8/1997 | Yarmchuk et al. | |
| 5,668,679 A | 9/1997 | Swearingen et al. | |
| 5,757,574 A | 5/1998 | Chainer et al. | |
| 5,793,554 A | 8/1998 | Chainer et al. | |
| 5,844,742 A | 12/1998 | Yarmchuk et al. | |
| 5,875,064 A | 2/1999 | Chainer et al. | |
| 5,907,447 A | 5/1999 | Yarmchuk et al. | |
| 6,005,738 A | 12/1999 | Chainer et al. | |
| 6,008,962 A | 12/1999 | Le et al. | |
| 6,031,680 A | 2/2000 | Chainer et al. | |
| 6,049,442 A | 4/2000 | Fukushima et al. | |
| 6,061,201 A | 5/2000 | Woods | |
| 6,075,668 A | 6/2000 | Chainer et al. | |
| 6,078,450 A | 6/2000 | Chainer et al. | |
| 6,091,564 A | 7/2000 | Codilian et al. | |
| 6,101,055 A | 8/2000 | Chainer et al. | |
| 6,101,063 A | 8/2000 | Chainer et al. | |
| 6,101,064 A * | 8/2000 | Shepherd | 360/77.08 |
| 6,344,942 B1 | 2/2002 | Yarmchuk | |
| 6,421,197 B1 | 7/2002 | Abdelnour | |
| 6,510,017 B1 | 1/2003 | Abdelnour | |
| 6,631,046 B2 | 10/2003 | Szita et al. | |
| 6,633,451 B1 | 10/2003 | Chainer et al. | |
| 6,650,491 B2 | 11/2003 | Suzuki et al. | |
| 6,657,810 B1 | 12/2003 | Kupferman | |
| 6,724,558 B2 | 4/2004 | Bryant et al. | |
| 6,751,042 B2 | 6/2004 | Bi et al. | |

(Continued)

*Primary Examiner*—Andrew L Sniezek
(74) *Attorney, Agent, or Firm*—Howard H. Sheerin, Esq.

(57) ABSTRACT

A disk drive is disclosed comprising control circuitry for self servo writing a disk. An estimated reader/writer offset is initialized, servo bursts in a first servo track are read, the head is moved radially using the estimated reader/writer offset, and propagated servo bursts are written to a target servo track. The propagated servo bursts are read from the target servo track to generate a read signal, the read signal is processed to generate a burst crossing signal (BCS), and the estimated reader/writer offset is adjusted in response to the BCS.

20 Claims, 9 Drawing Sheets

U.S. PATENT DOCUMENTS

| | | |
|---|---|---|
| 6,754,030 B2 | 6/2004 | Seng et al. |
| 6,765,744 B2 | 7/2004 | Gomez et al. |
| 6,798,610 B1 | 9/2004 | Deng et al. |
| 6,947,248 B2 | 9/2005 | Allen et al. |
| 6,954,325 B2 | 10/2005 | Liu et al. |
| 6,977,789 B1 | 12/2005 | Cloke |
| 6,989,954 B1 | 1/2006 | Lee et al. |
| 6,992,848 B1 | 1/2006 | Agarwal et al. |
| 7,006,322 B2 | 2/2006 | Sado |
| 7,019,939 B2 | 3/2006 | Kusumoto et al. |
| 7,046,472 B1 | 5/2006 | Melkote et al. |
| 7,088,533 B1 | 8/2006 | Shepherd et al. |
| 7,133,237 B2 | 11/2006 | Ikeda et al. |
| 7,161,759 B1 | 1/2007 | Zhang et al. |
| 7,203,024 B2 | 4/2007 | Lee et al. |
| 7,209,312 B1 | 4/2007 | Sutardja |
| 7,212,369 B1 | 5/2007 | Levy et al. |
| 7,215,514 B1 | 5/2007 | Yang et al. |
| 7,405,897 B2 | 7/2008 | Dougherty et al. |
| 2005/0168858 A1* | 8/2005 | Lee et al. .................. 360/31 |
| 2005/0264917 A1 | 12/2005 | Yano et al. |
| 2007/0211367 A1 | 9/2007 | Lau et al. |

* cited by examiner

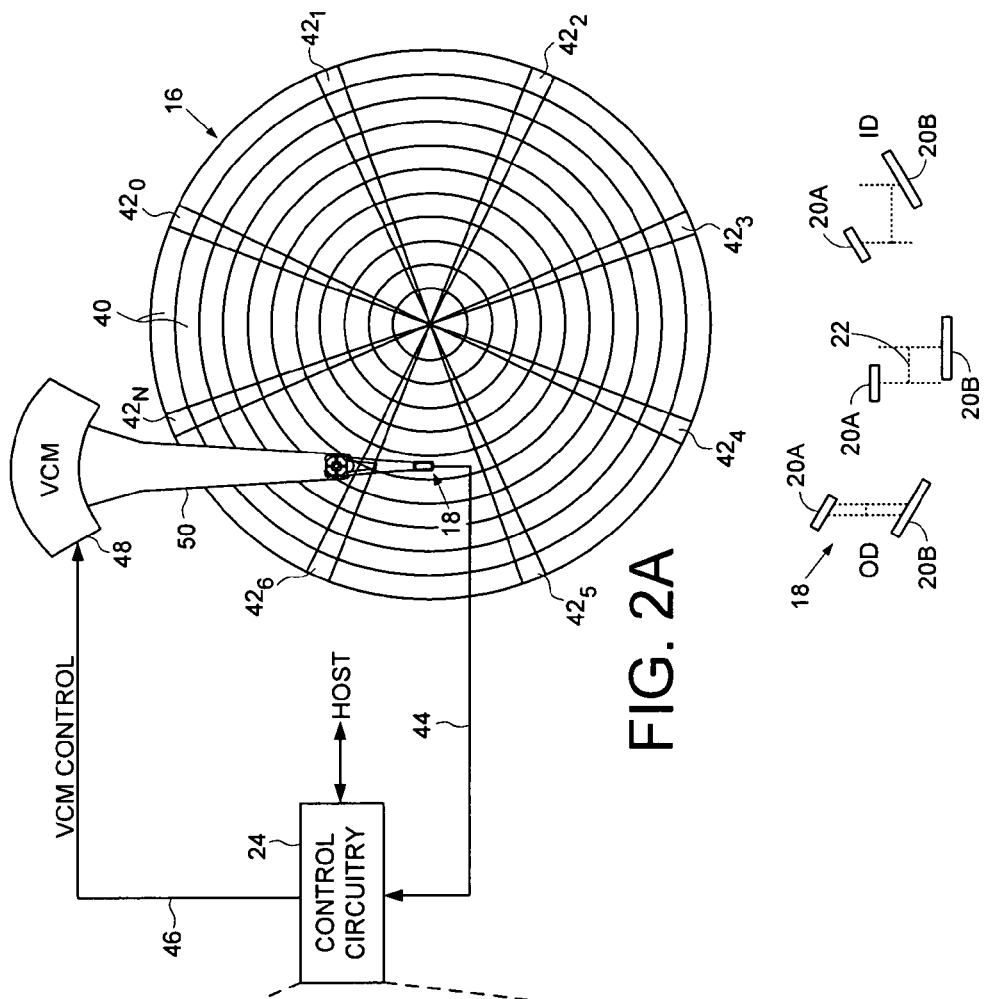
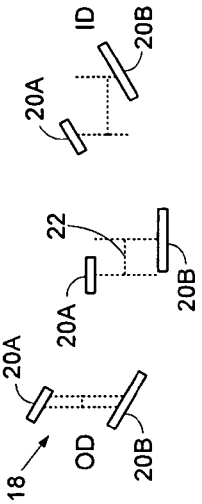
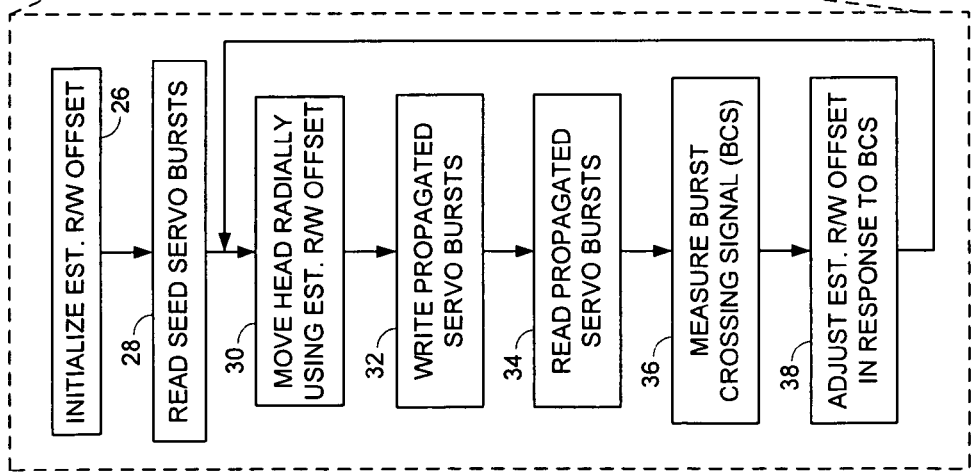
FIG. 2A
FIG. 2B
FIG. 2C

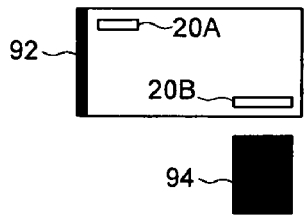
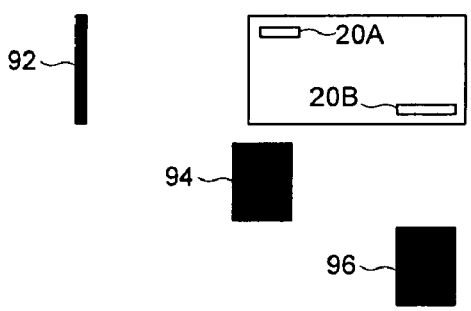
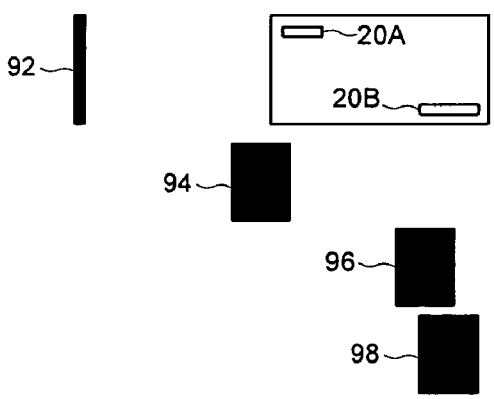
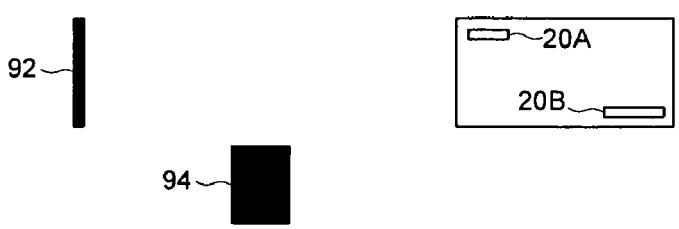

DISK DRIVE ADJUSTING ESTIMATED READER/WRITER OFFSET TO ACHIEVE TARGET BURST CROSSING SIGNAL AMPLITUDE WHEN PROPAGATING SERVO SECTORS

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 2 as comprising a number of data tracks 6 defined by servo sectors $4_0$-$4_N$ recorded around the circumference of each data track. Each servo sector $4_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $4_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

Various techniques have been suggested for self servo writing the servo sectors $4_0$-$4_N$ including to propagate the servo sectors from a seed track. However, when self servo writing by propagating the servo sectors it is desirable to maintain a target track pitch which means compensating for the variation in the reader/writer offset which changes as the head skew angle changes.

BRIEF DESCRIPTION OF THE DRAWINGS

FIG. 2A shows a disk drive according to an embodiment of the present invention comprising a disk, a head comprising a read element and a write element, and control circuitry.

FIG. 2B shows a flow diagram according to an embodiment of the present invention executed by the control circuitry for self servo writing the disk by adjusting an estimated reader/writer offset of the head while propagating servo bursts.

FIG. 2C shows an embodiment of the present invention wherein the head comprises a reader/writer offset such that the read element leads the write element across the radius of the disk.

FIGS. 8A-8D show an embodiment of the present invention wherein seed servo bursts are written in order to calibrate the burst crossing threshold.

DETAILED DESCRIPTION OF EMBODIMENTS OF THE INVENTION

Figure 1:
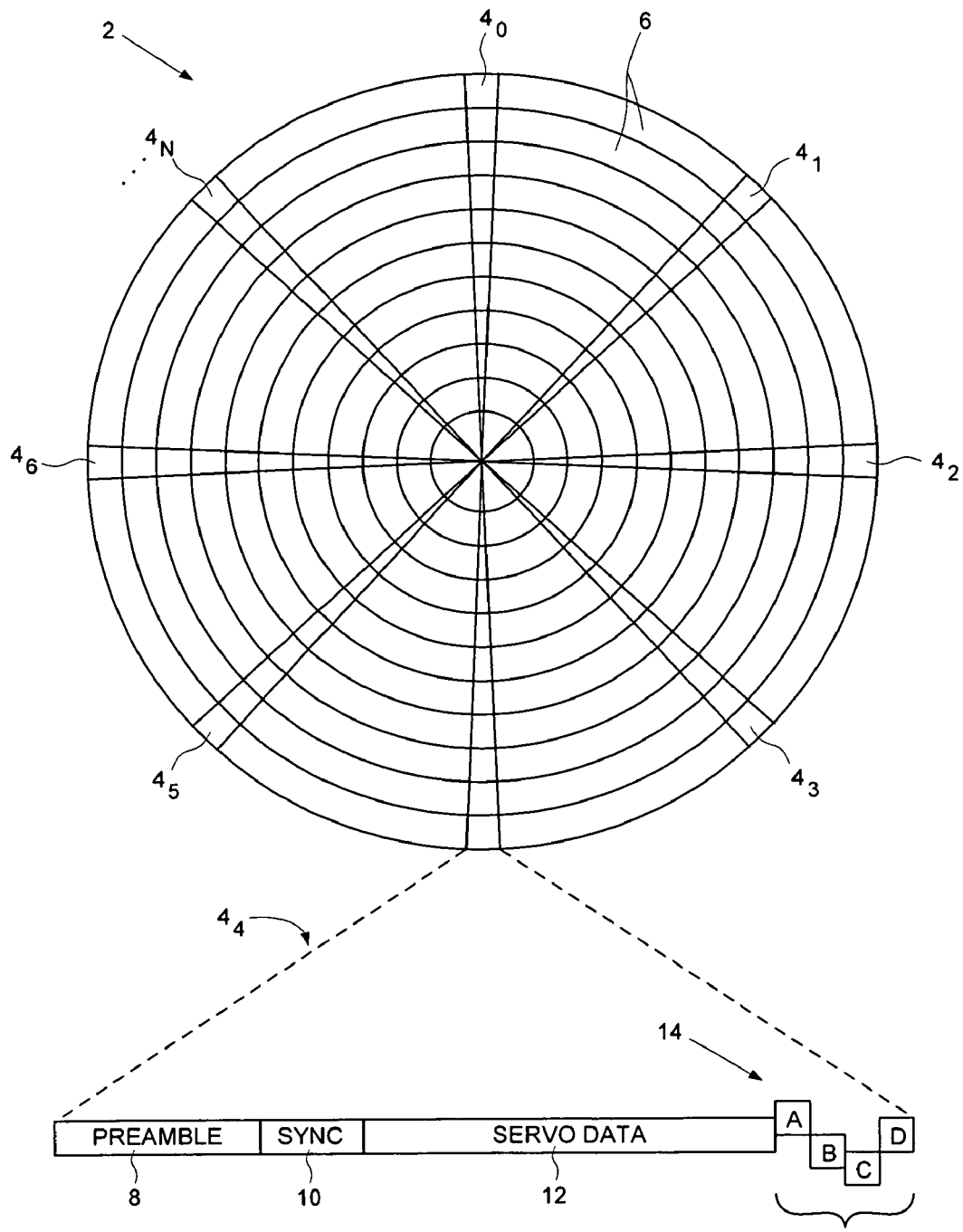
FIG. 1 shows a prior art disk format comprising a plurality of data tracks defined by servo sectors.

FIG. 2A shows disk drive according to an embodiment of the present invention comprising a disk 16, and a head 18 actuated over the disk 16, wherein the head 18 comprises a read element 20A radially offset from a write element 20B (FIG. 2C) forming a reader/writer offset 22. The disk drive further comprises control circuitry 24 for executing the flow diagram of FIG. 2B in order to self servo write the disk 16. An estimated reader/writer offset is initialized (step 26), servo bursts in a first servo track are read (step 28), the head is moved radially using the estimated reader/writer offset (step 30), and propagated servo bursts are written to a target servo track (step 32). The propagated servo bursts are read from the target servo track to generate a read signal (step 34), the read signal is processed to generate a burst crossing signal (BCS) (step 36), and the estimated reader/writer offset is adjusted in response to the BCS (step 38).

In the embodiment of FIG. 2A, the disk 16 comprises a plurality of data tracks 40 defined by a plurality of embedded servo sectors $42_0$-$42_N$. The control circuitry 24 processes the read signal 44 emanating from the head 18 to demodulate the servo sectors $42_0$-$42_N$ and generate a position error signal (PES) representing an error between the actual position of the head and a target position relative to a target data track. The control circuitry 24 filters the PES using a suitable compensation filter to generate a control signal 46 applied to a voice coil motor (VCM) 48 which rotates an actuator arm 50 about a pivot in order to actuate the head 18 radially over the disk in a direction that reduces the PES.

In one embodiment, the read element 20A is offset radially from the write element 20B (FIG. 2C) such that the write element 20B leads the read element 20A as the head moves radially over substantially the entire radius of the disk. In the embodiment of FIG. 2C, the write element 20B leads the read element 20A as the head moves from the outer diameter of the disk to the inner diameter of the disk. This embodiment enables the read element 20A to read the servo bursts of previously written servo sectors while writing the propagated servo sectors across the radius of the disk.

Figure 3B:
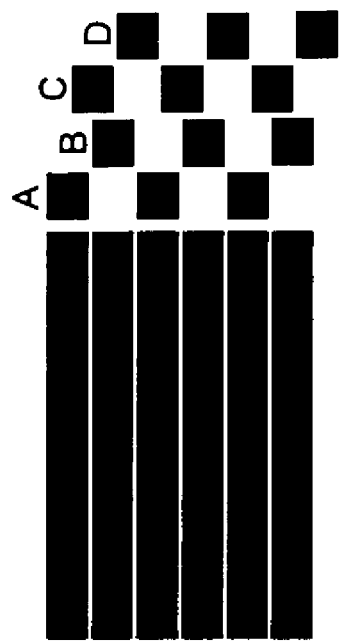
FIGS. 3A and 3B illustrate an embodiment of the present invention wherein intermediate servo bursts are propagated which are used to write product servo sectors to the disk.
Figure 3A:
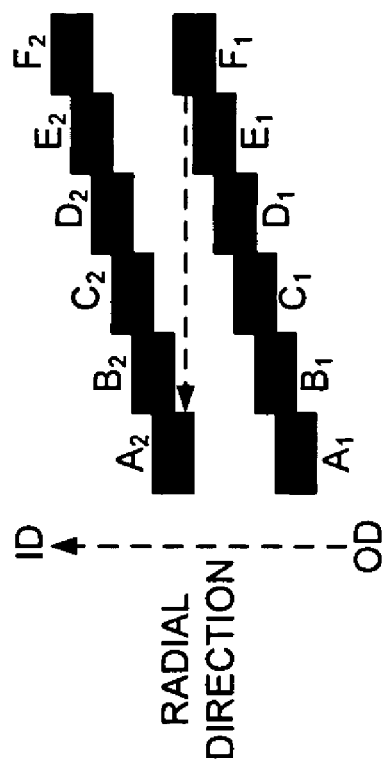

FIG. 3A shows an embodiment of the present invention wherein intermediate servo bursts are propagated and then used to write product servo sectors to the disk as shown in FIG. 3B. The servo bursts A-F are written sequentially from the OD toward the ID. The read element 20A reads previously written servo bursts (e.g., servo bursts $A_1$ and $B_1$) in order to servo the head while writing a propagated servo burst (e.g., servo burst $C_1$). When writing servo burst $A_2$, previously written servo bursts are also read to servo the head, for example, servo bursts $E_1$ and $F_1$, thereby forming the repeating pattern shown in FIG. 3A from the OD to ID (or from the ID to OD). The pattern is also repeated a suitable number of times around the circumference of the disk similar to the product servo sectors. After propagating the intermediate servo bursts from the OD to ID, the intermediate servo bursts are used to servo the head while writing the product servo sectors to the disk as shown in FIG. 3B.

As the head moves across the radius of the disk as shown in FIG. 2C, the reader/writer offset 22 will change due to the change in the head skew angle. In order to compensate for the change in the reader/writer offset 22, the control circuitry 24 generates an estimated reader/writer offset that is used to adjust the servoing algorithm, thereby achieving a desired radial spacing of the propagated servo bursts. In one embodiment, the estimated reader/write offset is generated in a manner that maintains a constant radial spacing between the propagated servo bursts.

Figure 4:
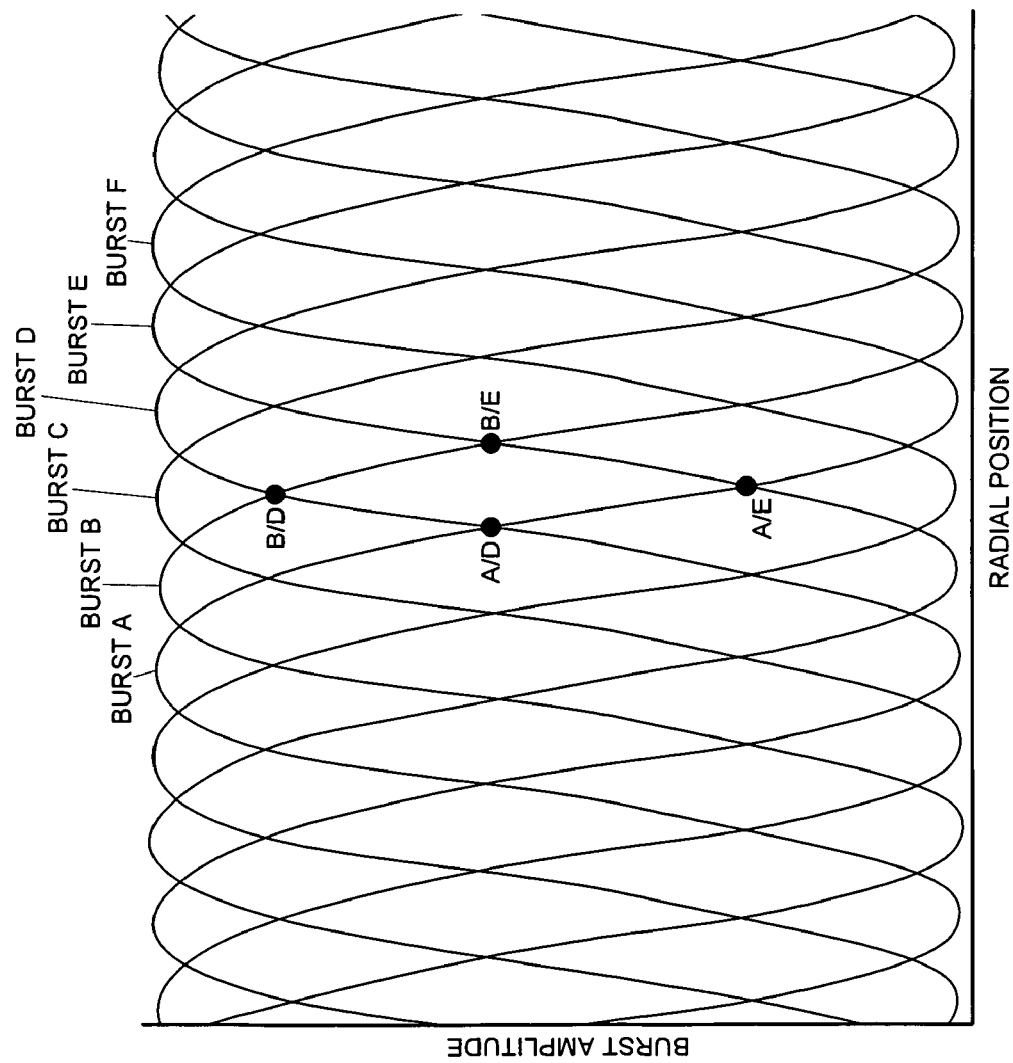
FIG. 4 shows an embodiment of the present invention wherein the estimated reader/writer offset is adjusted in response to one or more burst crossing signals.

FIG. 4 illustrates an embodiment of the present invention for adjusting the estimated reader/write offset in response to a burst crossing signal. Each sinusoidal wave shown in FIG. 4 represents the burst amplitude signals for each of the A-F servo bursts of FIG. 3A as the head moves radially across the disk. At a given radial location, two of the burst amplitude signals will cross, such as when the burst amplitude of burst A crosses the burst amplitude of burst D as indicated by the A/D dot. By adjusting the estimated reader/offset so that the burst crossing single is adjusted relative to a burst crossing threshold, the resulting radial spacing between propagated servo bursts can be controlled. For example, adjusting the estimated reader/write offset so that the burst crossing signal constantly equals the burst crossing threshold will maintain a constant radial spacing between the propagated servo bursts as the head moves across the radius of the disk.

Figure 5:
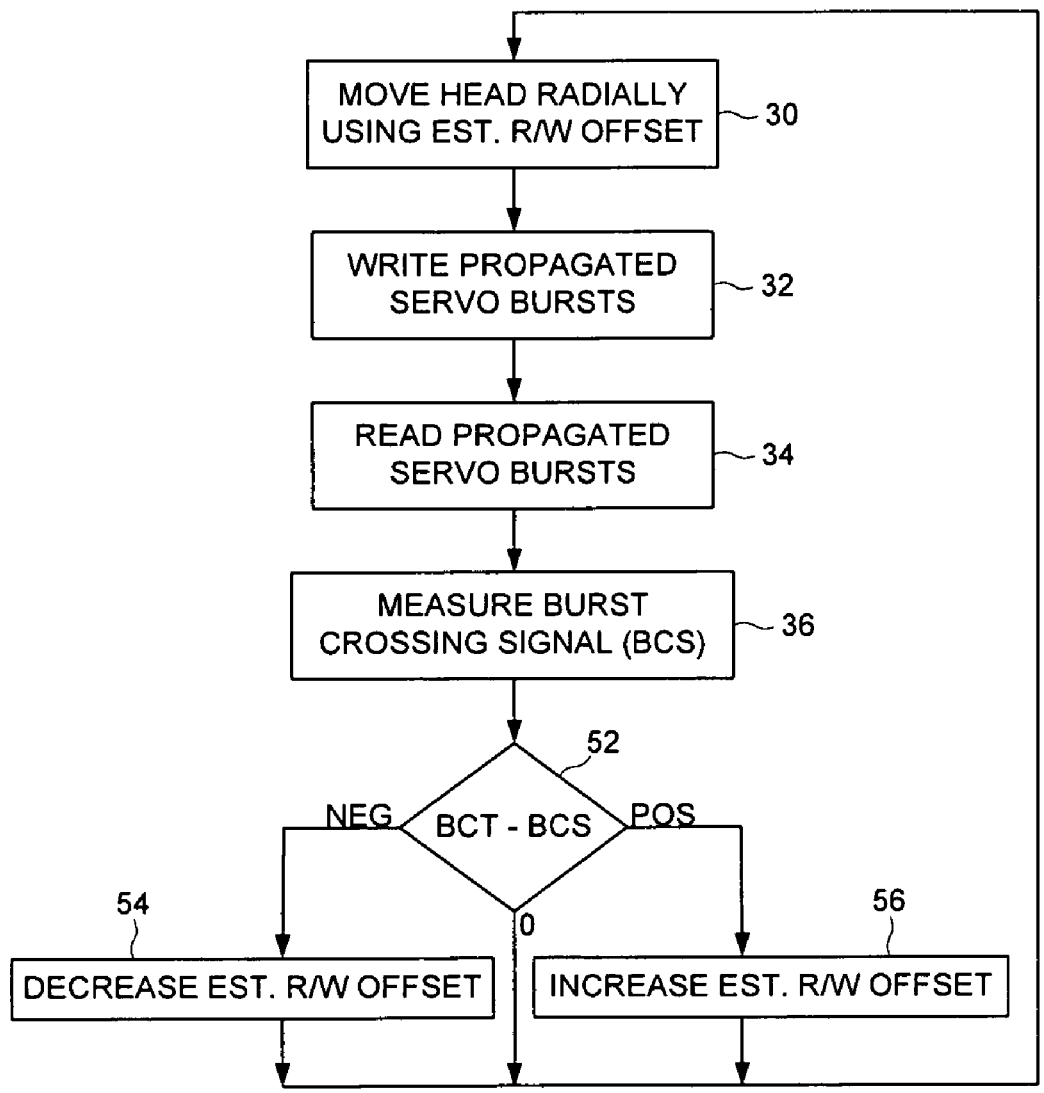
FIG. 5 is a flow diagram according to an embodiment of the present invention wherein the estimated reader/writer offset is adjusted by comparing the burst crossing signal to a burst crossing threshold.

FIG. 5 is a flow diagram executed by the control circuitry 24 according to an embodiment of the present invention for maintaining a constant radial spacing between the propagated servo bursts. The flow diagram of FIG. 5 expounds on step 38 of the flow diagram of FIG. 2B wherein the burst crossing signal (BCS) is subtracted from a burst crossing threshold (BCT) (step 52). If the result is negative, then the estimated reader/writer offset is decreased (step 54), and if the result is positive, then the estimated reader/writer offset is increased. The adjusted estimated reader/writer offset is then used to move the head radially (step 30) in order to write the next propagated servo bursts.

In one embodiment, the BCS and BCT for adjusting the estimated reader/writer offset changes relative to the radial location of the head. Referring again to FIG. 4, the first BCS may be the A/D BCS as shown by the A/D dot, and then as the head moves radially, the BCS may change to either (or both) of the B/D BCS and the A/E BCS as well as well as changing respective BCTs.

Figure 6A:
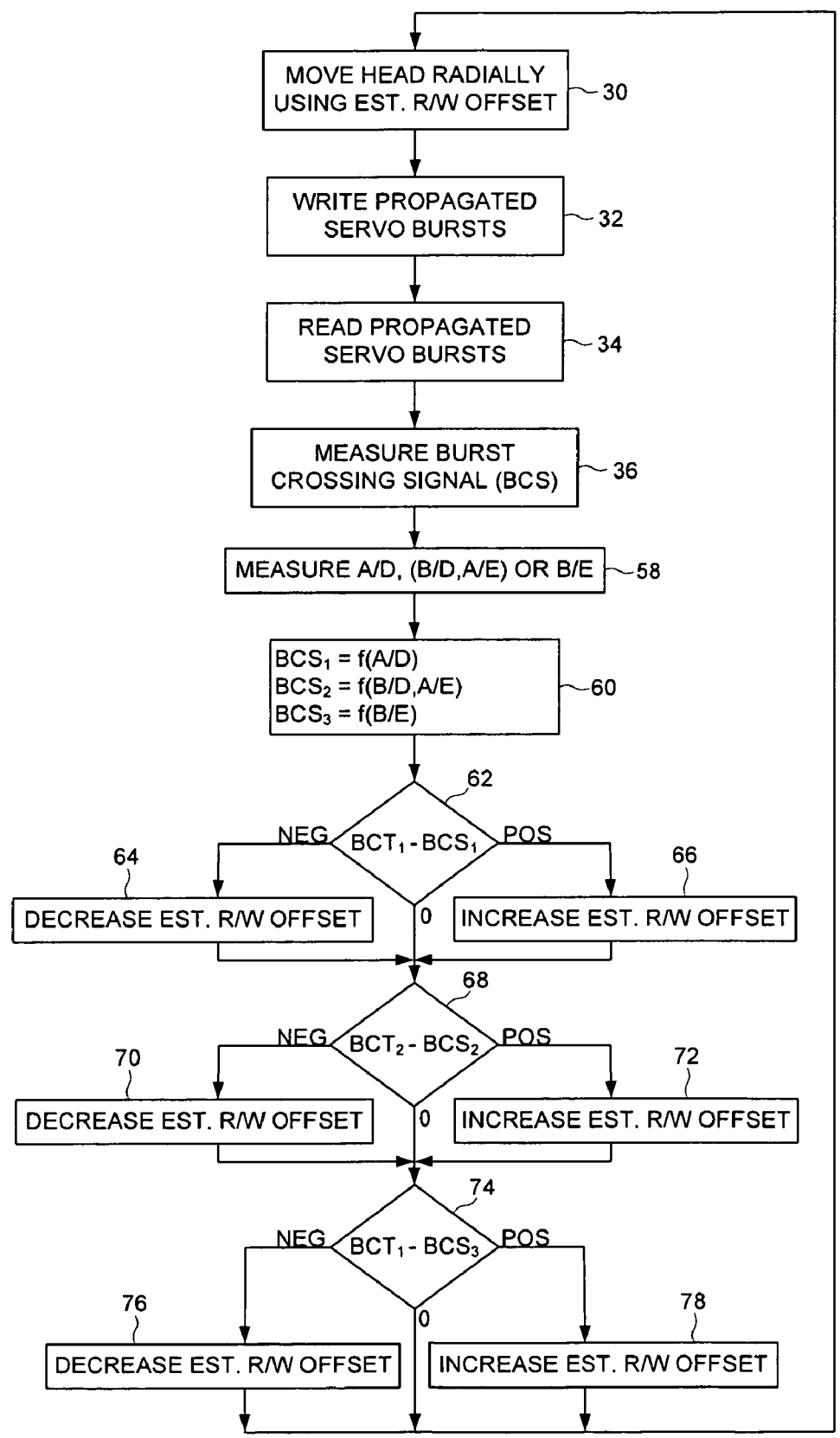
FIG. 6A shows a flow diagram according to an embodiment of the present invention wherein multiple burst crossing signals are compared to respective burst crossing thresholds.

FIG. 6A is a flow diagram according to another embodiment of the present invention which expounds on step 38 of the flow diagram of FIG. 2B. One more burst crossing is measured (step 58), such as the A/B burst crossing as described above relative to FIG. 4. A first $BSC_1$ is generated as a function of the burst crossing A/D, or a second $BSC_2$ is generated as a function of the burst crossings B/D and A/E, or a third $BSC_3$ is generated as a function of the burst crossing B/E. Any suitable function or functions may be employed. In one embodiment, the burst crossings are weighted based on a reliability of the BCS relative to the radial location of the head. For example, the B/D and A/E burst crossings may provide a less reliable signal than the A/D and B/E burst crossings. Therefore, in one embodiment the function may comprise weighting the burst crossings with a respective scalar so that, for example, the B/D and A/E burst crossings have less of an affect on the change in the estimated reader/writer offset as compared to the A/D and B/E burst crossings. When the radial location of the head reaches the A/D burst crossing, the $BSC_1$ is subtracted from a first $BCT_1$ (step 62) and the result used to decrease (step 64) or increase (step 66) the estimated reader/writer offset. When the radial location of the head reaches the B/D and A/E burst crossings, the $BSC_2$ is subtracted from a second $BCT_2$ (step 68) and the result used to decrease (step 70) or increase (step 72) the estimated reader/writer offset. When the radial location of the head reaches the B/E burst crossing, the $BSC_3$ is subtracted from the first $BCT_1$ (step 74) and the result used to decrease (step 76) or increase (step 78) the estimated reader/writer offset.

Figure 6B:
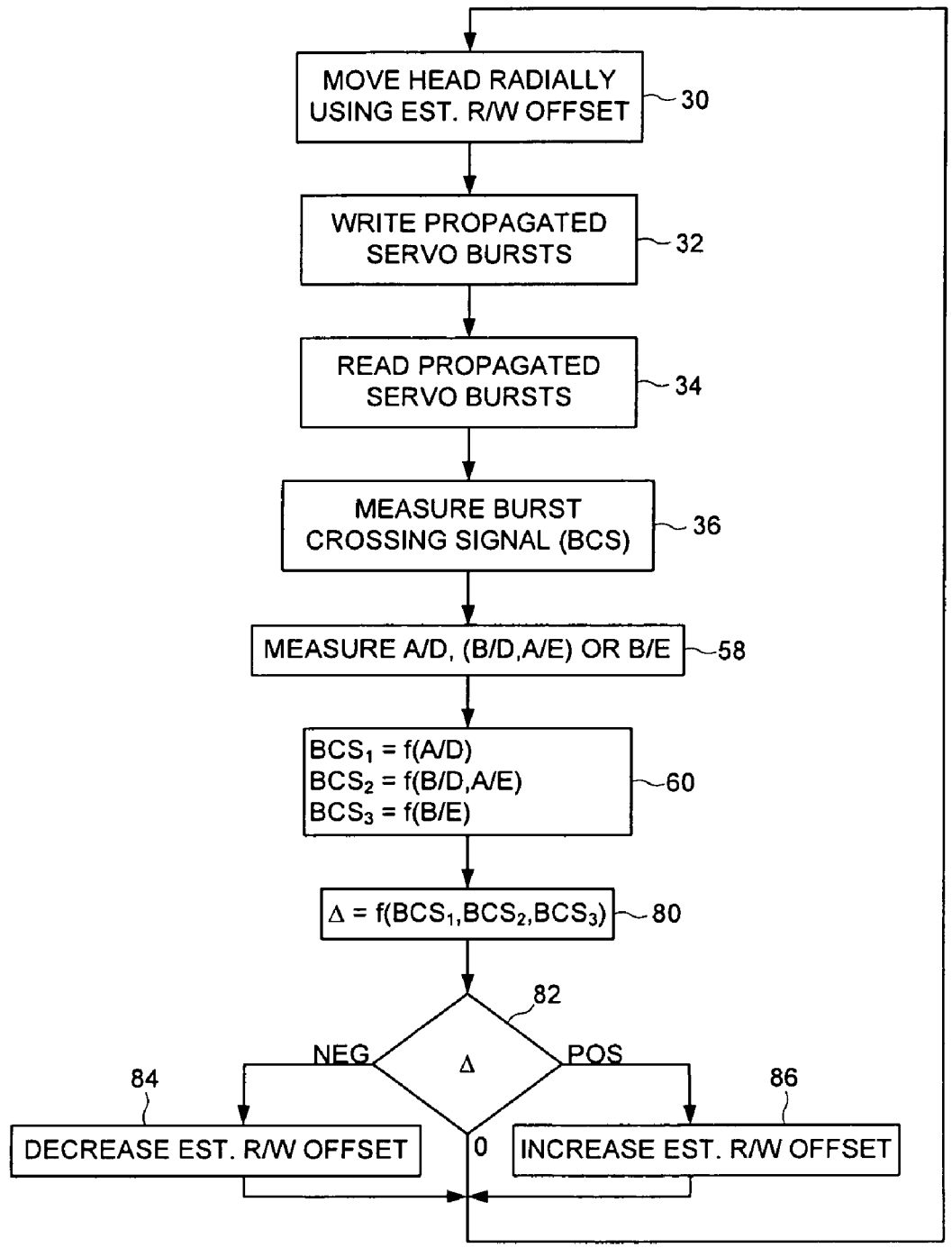
FIG. 6B shows a flow diagram according to an embodiment of the present invention wherein a delta is computed as a function of the burst crossing signals and the estimated reader/writer offset is adjusted in response to the delta.

FIG. 6B is a flow diagram according to another embodiment of the present invention wherein a delta is computed as a function of the plurality of BCSs (step 80), and the estimated reader/writer offset is adjusted in response to the delta, for example, by evaluating the sign of the delta (step 82). For example, the estimated reader/writer offset is increased if the sign is negative (step 84), and the estimated reader/writer offset is increased if the sign is positive (step 86). The delta may be computed using any suitable function, such as a function that averages the BCSs. In one embodiment, the control circuitry 24 may compute a running average and update the estimated reader/writer offset at each BSC, or the control circuitry 24 may compute an average after every $n^{th}$ BCS (e.g., at every $4^{th}$ BCS).

Figure 7:
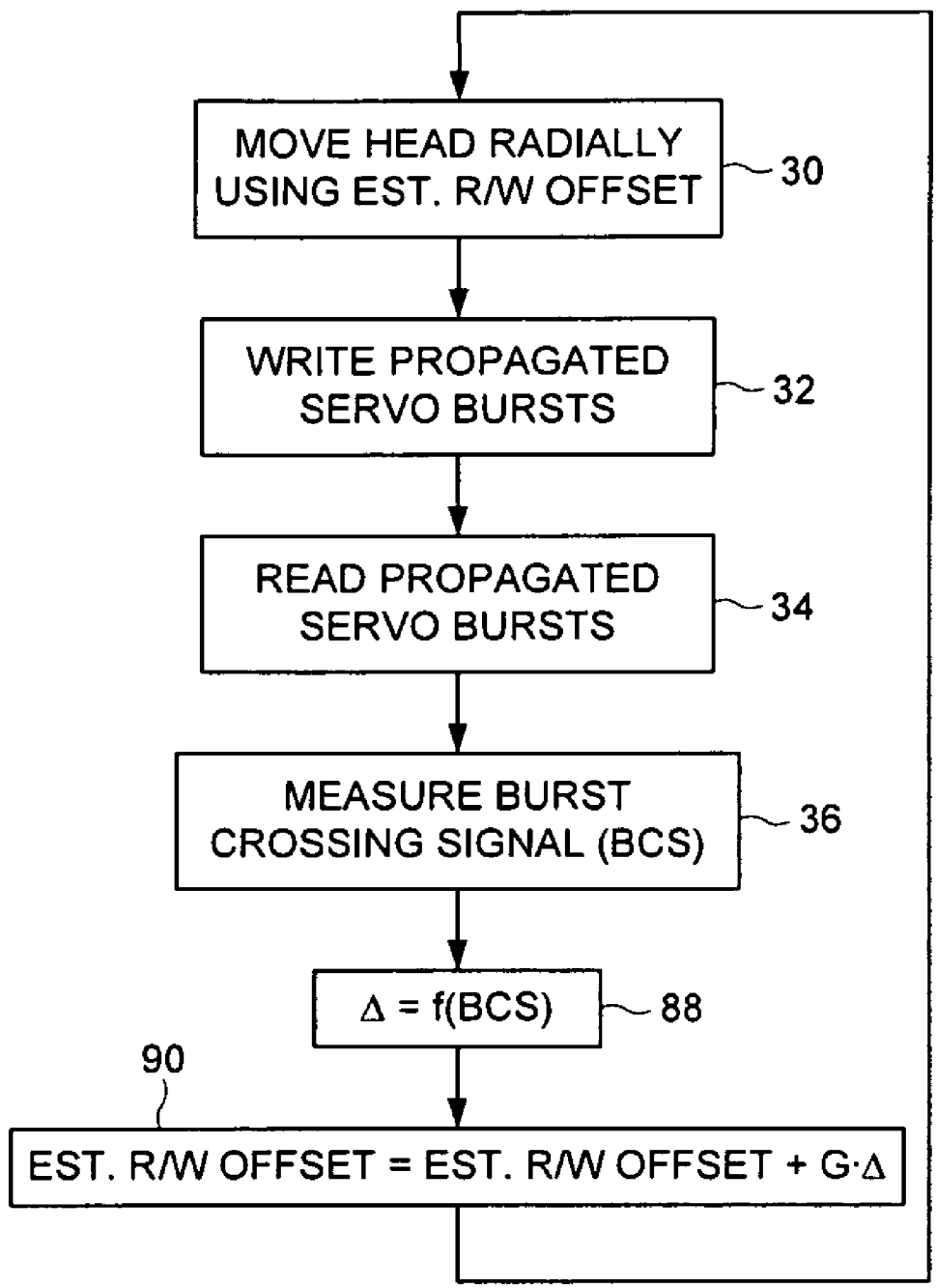
FIG. 7 shows a flow diagram according to an embodiment of the present invention wherein the estimated reader writer offset is adjusted in response to a scaled delta value.

FIG. 7 is a flow diagram according to another embodiment of the present invention wherein a delta is computed as a suitable function of the BCS, such as a simple difference from a BCT, or a more complex function (step 88). The delta is scaled using a gain value G, and the scaled delta is added to the estimated reader/writer offset in order to adjust the reader/writer offset (step 90). The gain value G may be determined in any suitable manner, such as a nominal value determined for a family of disk drives. In another embodiment, the gain value G may be calibrated prior to and/or adapted during the self servo writing process in response to a suitable metric, such as the quality of the read signal.

Any suitable servo bursts may be propagated across the disk in the embodiments of the present invention. In the embodiment of FIG. 3A, an intermediate servo burst pattern is propagated which is then used to write the product servo sectors as shown in FIG. 3B. In another embodiment, the product servo bursts (and product servo data) may be propagated directly. In addition, the product servo bursts may comprise any suitable servo pattern, wherein the quadrature servo pattern shown in FIG. 3B is merely an example.

In one embodiment, prior to propagating the servo bursts, the BCT (or BCTs) is calibrated in response to seed servo bursts written to the disk. The seed servo bursts may be written to the disk in any suitable manner, such as with an external servo writer, or a media writer. The BCT is then determined by reading the seed servo bursts and setting the BCT equal to the initial BCS measurement, or a desired percentage of the initial BCS.

In one embodiment, the control circuitry 24 within each production disk drives writes the seed servo bursts to the disk, wherein FIGS. 8A-8D illustrate an example of this embodiment. The write element 20B is positioned at a first radial location, for example, by moving the actuator arm 50 until it presses against a crash stop 92. A first servo burst 94 is written at the first radial location, and then the read element 20A is positioned at a first percentage (e.g., 75%) over the first servo burst 94 in order to position the write element 20B at a second radial location. A second servo burst 96 is then written at the second radial location. The read element 20A is positioned at a second percentage (e.g., 25%) over the first servo burst 94 in order to position the write element 20B at a third radial location, and a third servo burst 98 is written at the third radial location. This process is repeated to write servo bursts 100-104, and so on, until a full set of servo bursts have been written enabling the read element 20A to generate a full set of initial BCS. In the embodiment of FIG. 8D, the resulting seed servo bursts are offset radially by 50% of the width of the read element 20A, however, any suitable spacing may be employed.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk, the head comprising a read element offset radially from a write element forming a reader/writer offset; and
   control circuitry operable to self servo write the disk by:
   (a) initializing an estimated reader/writer offset;
   (b) reading servo bursts in a first servo track;
   (c) moving the head radially using the estimated reader/writer offset;
   (d) writing propagated servo bursts to a target servo track;
   (e) reading the propagated servo bursts from the target servo track to generate a read signal;
   (f) processing the read signal to generate a burst crossing signal (BCS);
   (g) adjusting the estimated reader/writer offset in response to the BCS; and
   (h) repeating (c) through (g) at least once.

2. The disk drive as recited in claim 1, wherein the control circuitry decreases the estimated reader writer offset if the BCS is greater than a burst crossing threshold.

3. The disk drive as recited in claim 1, wherein the control circuitry increases the estimated reader writer offset if the BCS is less than a burst crossing threshold.

4. The disk drive as recited in claim 1, wherein the control circuitry is further operable to self servo write the disk by:
   measuring a plurality of BCSs from reading the propagated servo bursts; and
   adjusting the estimated reader/writer offset in response to the plurality of BCSs.

5. The disk drive as recited in claim 4, wherein the control circuitry is further operable to self servo write the disk by:
   computing a delta as a function of the plurality of BCSs; and
   adjusting the estimated reader/writer offset in response to the delta.

6. The disk drive as recited in claim 5, wherein the control circuitry is further operable to compute the delta by weighting each BCS with a respective scalar.

7. The disk drive as recited in claim 5, wherein the control circuitry is further operable to compute the delta by:
   computing a difference between each BCS and a corresponding burst crossing threshold; and
   computing an average of the differences.

8. The disk drive as recited in claim 1, wherein the control circuitry is operable to adjust the estimated reader/writer offset by:
   generating a delta as a function of the BCS;
   scaling the delta with a gain value; and
   adding the scaled delta to the estimated reader/writer offset.

9. The disk drive as recited in claim 1, wherein the control circuitry is further operable to self servo write the disk by:
   calibrating a burst crossing threshold;
   comparing the BCS to the burst crossing threshold; and
   adjusting the estimated reader/writer offset in response to the comparison.

10. The disk drive as recited in claim 9, wherein the control circuitry is further operable to calibrate the burst crossing threshold in response to a plurality of seed servo bursts written to the disk.

11. A method of servo writing a disk of a disk drive, the disk drive comprising the disk, a head actuated over the disk, the head comprising a read element offset radially from a write element forming a reader/writer offset, the method comprising:
    (a) initializing an estimated reader/writer offset;
    (b) reading servo bursts in a first servo track;
    (c) moving the head radially using the estimated reader/writer offset;
    (d) writing propagated servo bursts to a target servo track;
    (e) reading the propagated servo bursts from the target servo track to generate a read signal;
    (f) processing the read signal to generate a burst crossing signal (BCS);
    (g) adjusting the estimated reader/writer offset in response to the BCS; and
    (h) repeating (c) through (g) at least once.

12. The method as recited in claim 11, wherein adjusting the estimated reader writer offset comprises decreasing the estimated reader writer offset if the BCS is greater than a burst crossing threshold.

13. The method as recited in claim 11, wherein adjusting the estimated reader writer offset comprises increasing the estimated reader writer offset if the BCS is less than a burst crossing threshold.

14. The method as recited in claim 11, further comprising:
    measuring a plurality of BCSs from reading the propagated servo bursts; and
    adjusting the estimated reader/writer offset in response to the plurality of BCSs.

15. The method as recited in claim 14, further comprising:
    computing a delta as a function of the plurality of BCSs; and
    adjusting the estimated reader/writer offset in response to the delta.

16. The method as recited in claim 15, wherein computing the delta comprises weighting each BCS with a respective scalar.

17. The method as recited in claim 15, wherein computing the delta comprises:
- computing a difference between each BCS and a corresponding burst crossing threshold; and
- computing an average of the differences.

18. The method as recited in claim 11, wherein adjusting the estimated reader/writer offset comprises:
- generating a delta as a function of the BCS;
- scaling the delta with a gain value; and
- adding the scaled delta to the estimated reader/writer offset.

19. The method as recited in claim 11, further comprising:
- calibrating a burst crossing threshold;
- comparing the BCS to the burst crossing threshold; and
- adjusting the estimated reader/writer offset in response to the comparison.

20. The method as recited in claim 19, wherein the burst crossing threshold is calibrated in response to a plurality of seed servo bursts written to the disk.

* * * * *